United States Patent [19]
Underkofler et al.
[11] 3,844,799
[45] Oct. 29, 1974

[54] ELECTROLESS COPPER PLATING

[75] Inventors: William L. Underkofler, Vestal; Theodore D. Zucconi, Endicott, both of N.Y.

[73] Assignee: International Business Machines Corporation, Armonk, N.Y.

[22] Filed: Dec. 17, 1973

[21] Appl. No.: 425,363

[52] U.S. Cl. .................................... 106/1, 117/160
[51] Int. Cl. .......................................... C23c 3/02
[58] Field of Search ........................................ 106/1

*Primary Examiner*—Lewis T. Jacobs
*Attorney, Agent, or Firm*—Joseph G. Walsh

[57] ABSTRACT

By means of constant control of the temperature between 70° and about 80°C. and control of the cyanide ion concentration between 0.0002 and 0.0004 molar, high quality electroless copper plating processes are carried out from solutions containing cupric ions.

7 Claims, No Drawings

ELECTROLESS COPPER PLATING

FIELD OF THE INVENTION

The present invention is concerned with a process for electroless copper plating. In particular it is concerned with a process for obtaining very high quality plating. Materials made according to the process of the present invention have such high quality that they are suitable, for example, in printed circuit applications where extremely high reliability is absolutely essential. In addition, the products made according to the process of the present invention have fine grained uniaxial metallurgical structure and can withstand the thermal shock of wave soldering without the cracking of surface lands or plated through holes. The process of the present invention is characterized by very careful control of the temperature and of the cyanide concentration of the plating bath.

PRIOR ART

Electroless copper plating, per se, is well known in the prior art. However, electroless copper deposits previously known have been deficient in metallurgical properties which are required for high quality and high reliability. In particular, the prior art materials have had poor deposit structure. This structure has generally been a coarsely columnar one. The prior art materials have also had low ductility and large fissures between grain boundaries which readily open to cracks under mechanical stressing. In contrast, the materials made by the process of the present invention stand severe mechanical testing without electrical or mechanical failure by cracking. The tests passed include flexing, hostile environment, repetitive thermal cycling and solder shock and rework. Deposits plated under the specified conditions contain less hydrogen than in the prior art by an order of magnitude. Hydrogen in copper deposits ordinarily is adsorbed on grain boundaries, promoting mechanical weakness at the boundaries.

The prior art describes many electroless copper plating baths including several which, at first blush, appear quite similar to that used in the present invention. U.S. Pat. No. 3,403,035 in Example 4 thereof shows an electroless plating process carried out at 80°C. in a bath containing cyanide ions. The concentration of the cyanide ions, however is 0.00001 molar, while for the process of the present invention, it is essential that the cyanide ion concentration be at least 20 times greater than that prior art value. This same reference, at line 62 of Column 4 does show a bath containing 0.0001 moles per liter of sodium cyanide, or half of that required in the present invention. It is to be noted that the reference says that with this concentration, no copper was deposited. The present invention, therefore, goes directly against the teaching of this prior art reference, and uses an even higher cyanide ion concentration.

U.S. Pat. No. 3,607,317 shows electroless plating processes carried out in the presence of cyanide ions but the temperature used is 45°C. (in bath one) and 60°C. (in bath 2). According to the process of the present invention, it is essential that the temperature be at least 70°C.

The teachings of U.S. Pat. Nos. 3,615,737 and 3,635,758 both include suggestions that the temperature of an electroless plating bath may be between 15° and 100°C., usually between 20° and 80°C. Both of these patents, however, specifically teach that the temperature may vary widely. (The former patent teaches this at Col. 6, Line 33 and the latter at Col. 5, line 44.) Thus, the process of the present invention goes directly contrary to the teaching of both of these prior art patents in that for the process of the present invention it is essential that the temperature be within the range from 70°C to about 80°C.

U.S. Pat. No. 3,095,309 teaches the preferred temperature for electroless copper plating to be from 40°C to 50°C (Column 5, line 15). Thus, the present invention is again contrary to the prior art.

SUMMARY OF THE INVENTION

The present invention is concerned with a process for electroless copper plating to produce products of superior electrical and mechanical properties. The process is characterized by very careful control of the temperature and of the cyanide ion concentration of the electroless plating bath.

Electroless copper plating baths have been known in the past. They contain a source of cupric ion generally, cupric sulfate. They contain a reducing agent such as formaldehyde. They contain a complexing agent for the cupric ion, such as ethylenediamine tetracetic acid (EDTA). They contain a surfactant and in some cases, other minor additives. A satisfactory surfactant is, for example, an organic phosphate ester available under the trademark Gafac RE—610. The pH of the system is often controlled, for example, by the addition of sodium hydroxide in the desired amount.

It has now been found that vast improvement in the end product can be obtained in electroless plating processes when the temperature of the bath during the plating operation is controlled between 70° and about 80°C. When the temperature is allowed to fall below 70°C. cracking of the plated surface results. Very good results are obtained over the range of 70° – 77°. The most preferred temperature is 73°C. Above about 80°, however, the process is not conveniently carried out due to equipment limitations.

In the process of the present invention, it is also essential that the cyanide ion concentration be carefully controlled. The desired results are obtained when and only when the cyanide ion concentration is maintained during the plating operation at a value of from 0.0002 to 0.0004 molar. This corresponds to a concentration of from about 10 to about 20 milligrams per liter of sodium cyanide. When the concentration is allowed to go below 0.0002 molar, there is insufficient cyanide present to provide the required structural modification action. On the other hand, when the cyanide ion concentration is above 0.0004 molar the deposit tends toward a coarsely columnar structure and metallurgical properties decline with the plated structure cracking under thermal shock of wave soldering.

It should particularly be noted that it is necessary that continuous control of temperature and cyanide ion concentration be maintained. The reason for this is not understood, but the empirical fact is that the bath operates with what might be called "chemical hysteresis," i.e., if the conditions are allowed to go out of the required range, and are then corrected back to within the required range, it will be several hours before sound deposits can be obtained again. The reason for this is not understood, but it is postulated that perhaps the sluggish reactions which are operated in the bath permit only slow approach to the required equilibrium.

The following Examples are given solely for purposes of illustration and are not to be considered limitations on the invention, many variations of which are possible without departing from the spirit or scope thereof.

EXAMPLE I

The following bath and operating conditions are used to illustrate a preferred embodiment of the present invention:

| | |
|---|---|
| Formulation: | |
| Ethylenediamine tetraacetic acid dihydrate | 30–50 g/l |
| Cupric sulfate pentahydrate | 8–12 g/l |
| Formaldehyde | 0.7–2.2 g/l |
| Sodium hydroxide | to pH 11.6–11.8 |
| Surfactant | 0.2–0.3 g/l |
| Sodium cyanide | 10–25 mg/l |
| Operating Conditions: | |
| Temperature | 70–80°C |
| Specific gravity* | 1.060–1.080 |
| Aeration | Continuous air bubbling |
| Stirring | 10 times per hour turnover |
| Agitation | Continuous agitation of plating racks |
| Plating rate** | 0.06–0.12 mil/hour |

*Specific gravity increases through by-product buildup. It is controlled by bleeding off used bath and adding fresh bath on a continuous basis.

**Plating rate is adjusted by controlling formaldehyde concentration within the stated limits.

By means of the process such as that described above, there are obtained copper deposits having quality comparing favorably to that produced by conventional electroplating (e.g., pyrophosphate) copper plating. The following table compares properties of a copper deposit produced by the process described immediately above and compares it with one produced by electroplating. It will be noted that the present electroless plating process compares favorably with electroplating.

Table I

| Property | Present Invention | Electroplated |
|---|---|---|
| Ductility - Elongation | 0.8–1.0% | 1.2–1.35% |
| Tensile Strength* | 35–40 Kpsi | 35–45 Kpsi |
| Yield Strength* | 20–30 Kpsi | 20–35 Kpsi |
| Hardness (Knoop 50) | 70–90 | 55–75 |
| Resistivity | $1.80 \times 10^{-6}$ ohm-cm | $1.87 \times 10^{6}$ ohm-cm |
| Folding Endurance | 19 cycles | 22 cycles |
| Hydrogen Content | 0.62 c.c./gm | — |

The following Table illustrates the critical effect of temperature on copper deposit properties:

Table II

| | | | | | | | |
|---|---|---|---|---|---|---|---|
| Formulation | | | | | | | |
| $CuSO_4 \cdot 5H_2O$ | (g/l) | 10 | 10 | 10 | 10 | 10 | 7.5 |
| EDTA | (g/l) | 35 | 35 | 35 | 35 | 35 | 35 |
| Gafac RE-610 | (g/l) | 0.25 | 0.25 | 0.25 | 0.25 | 0.25 | 0.25 |
| NaCN | (mg/l) | 15 | 16 | 15 | 15 | 30 | 13 |
| pH | | 11.70 | 11.70 | 11.70 | 11.70 | 11.70 | 11.70 |
| HCHO (37%) | (ml/l) | 3.4 | 2.8 | 3.6 | 4.2 | 4.5 | 3.0 |
| Specific Gravity | | 1.065 | 1.065 | 1.065 | 1.065 | 1.065 | 1.065 |
| Temp. | (°C) | 73 | 71 | 76.5 | 66 | 69 | 73 |
| Results | | | | | | | |
| Plating Rate | (mil/hr) | .095 | .102 | .103 | .071 | .054 | .101 |
| Percent Cracks | | 0 | 0 | 0 | 87 | 25 | 0 |

The following Table illustrates the critical effect of cyanide ion concentration on copper deposit properties:

Table III

| | | | | | | | |
|---|---|---|---|---|---|---|---|
| Formulation | | | | | | | |
| $CuSO_4 \cdot 5H_2O$ | (g/l) | 10 | 10 | 10 | 10 | 10 | 10 |
| EDTA | (g/l) | 35 | 35 | 35 | 35 | 35 | 35 |
| Gafac RE-610 | (g/l) | 0.25 | 0.25 | 0.25 | 0.25 | 0.25 | 0.25 |
| Sodium cyanide | (mg/l) | 14 | 12 | 18 | 35 | 30 | 40 |
| pH | | 11.70 | 11.70 | 11.70 | 11.70 | 11.70 | 11.70 |
| HCHO (37%) | (ml/l) | 3.3 | 3.7 | 3.4 | 5.0 | 3.0 | 3.5 |
| Specific Gravity | | 1.065 | 1.065 | 1.065 | 1.065 | 1.065 | 1.065 |
| Temp. | (°C) | 73 | 73 | 73 | 73 | 73 | 73 |
| Results | | | | | | | |
| Plating Rate (mil/hr) | | .047 | .104 | .082 | .060 | .055 | .050 |
| Percent Cracks | | 0 | 0 | 0 | 69 | 86 | 60 |

Other Variables

| | | | | | |
|---|---|---|---|---|---|
| Formulation | | | | | |
| $CuSO_4 \cdot 5H_2O$ | (g/l) | 10 | 10 | 10–5.4 | 10 |
| EDTA | (g/l) | 45 | 35 | 35 | 35 |
| Gafac RE-610 | (g/l) | 0.25 | 0.25 | 0.25 | 0.25 |
| Sodium cyanide | (mg/l) | 17 | 11 | 15 | 16 |
| pH | | 11.7 | 11.73 | 11.70 | 11.70–11.0 |
| HCHO (37%) | (ml/l) | 5.0 | 3.3 | 2.0 | 2.9 |
| Specific Gravity | | 1.080 | 1.065 | 1.042 | 1.065 |
| Temp. | (°C) | 73 | 73 | 73 | 73 |
| Results | | | | | |
| Plating Rate (mil/hr) | | .09 | .08 | .10 | .073 |
| Percent Cracks | | 0 | 0 | 0 | 0 |

A summary of the optimum and allowable ranges for the plating conditions used in the process of the present invention is given in Table IV below.

Table IV

| Bath Formulation - Operating Parameters and Ranges | Optimum Range | Allowable Range |
|---|---|---|
| Copper Sulfate Pentahydrate | 9–11 g/l | 7.5–12 g/l |
| Formaldehyde (37%) | 2.5–4 ml/l | 2–4.5 ml/l |
| Sodium cyanide | 9–15 mg/l | 7–20 mg/l |
| pH pH | 11.70 ± 0.02 | 11.70 ± 0.1 |
| Ethylenediamine Tetra-acetic Acid Dihydrate (EDTA) | 35 ± 5 g/l | 35 ± 10 g/l |
| Specific Gravity | 1.060–1.070 (25°C) | 1.060–1.080 (25°C) |
| Plating Rate | 0.095 ± 0.01 mil/hr | 0.07–0.12 mil/hr |
| Temperature | 73 ± 0.5°C | 70°C to 80°C |
| Bath Loading | 30–150 $cm^2/l$ | 30–200 $cm^2/l$ |
| Aeration | Continuous | Continuous |
| Gafac RE-610 Wetting Agent | 0.25 ± 0.05 g/l | 0.25 ± 0.1 g/l |

Notes:
1. The optimum range defines best operating conditions, and is the process control objective.
2. The allowable range gives the permitted deviations from the optimum range for temporary deviations only. Corrective action is to be taken to return to the optimum range.

What is claimed is:

1. An electroless copper plating process in which copper is deposited from a bath solution comprising cupric ions, a reducing agent, a surfactant, and a complexing agent for cupric ions, said process being characterized by the improvement acocording to which the temperature of the bath is maintained continuously between 70°C and 80°C and the bath is adjusted to maintain continuously a cyanide ion concentration within the range of 0.0002 to 0.0004 molar.

2. A process as claimed in claim 1 wherein the temperature is maintained within one half degree of 73°C.

3. A process as claimed in claim 1 wherein the cyanide ion concentration is maintained very close to 0.00025 molar.

4. A process as claimed in claim 1 wherein the reducing agent is formaldehyde.

5. A process as claimed in claim 1 wherein the complexing agent is ethylenediamine tetraacetic acid.

6. A process as claimed in claim 1 wherein the surfactant is an organic phosphate ester.

7. A process as claimed in claim 1 wherein the pH is maintained within the range 11.6 to 11.8.

* * * * *